United States Patent Office 3,767,725
Patented Oct. 23, 1973

3,767,725
METHOD OF TRANSPORTING ACETYLENE
David G. Walker, Baytown, and Donald A. Keyworth, Houston, Tex., assignors to Tenneco Chemicals, Inc.
No Drawing. Continuation-in-part of application Ser. No. 878,356, Nov. 20, 1969, now Patent No. 3,647,843. This application Jan. 7, 1972, Ser. No. 216,280
Int. Cl. C07c 11/24; 7/00
U.S. Cl. 260—679 A                        8 Claims

ABSTRACT OF THE DISCLOSURE

Acetylene is transported safely and economically by contacting an acetylene-containing gas in a first location with a solution of cuprous aluminum tetrachloride in an aromatic hydrocarbon or halogenated aromatic hydrocarbon to form a solution of an acetylene-cuprous aluminum tetrachloride complex in the aromatic solvent, transporting the solution containing the acetylene complex from the first location to a second location, contacting the solution in the second location with a countercurrent stream of a hydrocarbon vapor at 75° C. to 180° C., and recovering substantially pure acetylene from the resulting gas stream.

---

This is a continuation-in-part of our copending application Ser. No. 878,356, which was filed on Nov. 20, 1969, which is now U.S. Pat. No. 3,647,843.

This inveniton relates to a process for the storage and the transportation of acetylenic compounds. More particularly, it relates to the use of solutions of complexes of acetylenic compounds with cuprous aluminum tetrachloride as a storage and transportation medium for the acetylenic compounds.

In the past acetylene has commonly been stored under pressure in large tanks. It has been transported from the site at which it is produced to the storage area or to a site at which it is to be used, for example, in the production of vinyl chloride, vinyl acetate, or acrylonitrile, as a gas under pressure or as a solution in acetone, methyl pyrrolidone, dimethylformamide, or liquid ammonia. Such storage and transportation procedures tend to be hazardous because of the sensitivity to shock of acetylene and of compounds, such as acetylides, that are formed by side reactions. In addition the previously known procedures are expensive to operate because of the large amounts of solvent that must be stored or transported along with the acetylene and because of the need for refrigeration and/or high pressures to maintain the acetylene in solution.

It has been recognized that the chemical reaction of acetylene and other acetylenic compounds with a reagent to form relatively unstable compounds that can be handled safely and from which the acetylenic compound can readily be recovered would provide an economical and convenient means of storing and transporting these compounds. Until the present time, because no chemical reagent was known that would react with acetylene and other acetylenic compounds to form such chemical compounds or complexes, it was not possible to store and transport these compounds simply, safely and inexpensively.

In accordance with this invention, it has been found that solutions of complexes of acetylene and other acetylenic compounds with cuprous aluminum tetrachloride in aromatic hydrocarbon on halogenated aromatic hydrocarbon solvents provide an excellent means for the storage and transportation of these compounds. At ambient temperatures and at low partial pressures of acetylene, as much as three hundred times as much acetylene can be added to the cuprous aluminum tetrachloride complex in toluene as can be dissolved in the same amount of any of the well-known solvents for acetylene, such as acetone, methyl pyrrolidone, or dimethylformamide. In addition the solutions of the novel complexes are stable under ambient conditions, and they are not sensitive to shock. The acetylenic compound can be recovered substantially quantitatively by heating the solution to a temperature in the range of about 75° C. to 180° C.

The storage and transportation of the complexes of acetylene and other acetylenic compounds in an aromatic hydrocarbon or halogenated aromatic hydrocarbon is much simpler, less hazardous, and less expensive than the previously-known procedure for the handling of acetylenic compounds.

In the practice of this invention, a solution of the acetylenic compound-cuprous aluminum tetrachloride complex in an aromatic hydrocarbon or halogenated aromatic hydrocarbon is pumped through lines of moderate size to a storage area where it may be stored for periods ranging from about 1 hour to three days or more; the solution can then be pumped to another location where the acetylenic compound is stripped from the complex by heating it at about 75° C. to 180° C., and preferably at about 80° C., using benzene, toluene, heptane, chlorobenzene, chlorotoluene, chlorobenzene, or another hydrocarbon or halogenated hydrocarbon vapor as the stripping agent. The stripping agent, the cuprous aluminum tetrachloride complex, and the aromatic hydrocarbon or halogenated aromatic hydrocarbon are recovered and reused.

The complexes that serve as the storage medium are formed by contacting an acetylenic compound, for example, acetylene, with cuprous aluminum tetrachloride. The reaction by which the complexes are formed may be represented by the following equation:

$$RC{\equiv}CH + Cu(AlCl_4) \rightarrow RC{\equiv}CH{:}Cu(AlCl_4)$$

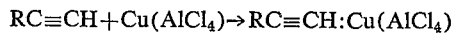

wherein R represents hydrogen, vinyl, ethynyl, or an alkyl group having from 1 to 10 carbon atoms. The complexes, which contain equivalent quantities of the acetylenic compound, cuprous chloride, and aluminum chloride, are stable at room temperature with a small gas pressure of the acetylenic compound; at high temperatures they decompose quantitatively to yield the acetylenic compound and cuprous aluminum tetrachloride. The complexes are soluble in benzene, toluene, xylenes, chlorobenzenes, bromobenzenes, chlorotoluenes, bromotoluenes, and other aromatic solvents.

In a preferred embodiment of this nvention, a gas mixture that contains as little as 2 mole percent of acetylene or another acetylenic compound is brought into contact with a solution that contains about 25 percent to 70 percent by weight of cuprous aluminum tetrachloride in an aromatic hydrocarbon at a temperature in the range of about −10° C. to 40° C. and at a gas pressure in the range of about 1 to 3 atmospheres. At 25° C. at a partial pressure of the acetylenic compound of 200 mm. Hg, the resulting solution contains about 28 percent to 75 percent by weight of the complex.

Particularly advantageous results are obtained when the gas mixture is brought into contact with a solution that contains 60 percent to 70 percent by weight of cuprous aluminum tetrachloride in toluene under ambient conditions. When an acetylene-containing gas is used, there is obtained a solution that contains 65 percent to 75 percent by weight of the acetylene-cuprous aluminum tetrachloride complex in toluene. This solution contains about 5 percent to 10 percent by weight of acetylene or about 2 moles to 4 moles of acetylene per liter of solution.

The acetylenic compounds that can be stored and transported by means of the process of this invention may be represented by the structural formula $$RC\equiv CH$$

wherein R represents hydrogen, vinyl, ethynyl, or an alkyl group having from 1 to 10 carbon atoms. Acetylene is the preferred acetylenic compound and the one that is ordinarily used in the practice of this invention. Other acetylenic compounds that may be used include allylene, ethylacetylene, tertiary butylacetylene, dodecyne-1, vinylacetylene, diacetylene, and the like. If desired, mixtures of acetylenic compounds may be used.

The cuprous aluminum tetrachloride complex with which the acetylenic compound is contacted may be prepared by methods that are known in the art. For example, excess cuprous chloride may be added to anhydrous aluminum chloride in an aromatic hydrocarbon solvent, such as benzene, toluene, or xylene, or a halogenated aromatic hydrocarbon solvent, such as chlorobenzenes, chlorotoluenes, chloroxylenes, bromobenzenes, or bromotoluenes. After the removal of excess cuprous chloride and impurities from the reaction mixture by filtration or by settling and decantation, the solution of cuprous aluminum tetrachloride in the aromatic hydrocarbon or halogenated aromatic hydrocarbon may be used in the process of this invention without further purification and without isolation of the metallic complex.

Extensive testing has shown that when acetylene is brought into contact with cuprous aluminum tetrachloride in an aromatic solvent, the acetylene-cuprous aluminum tetrachloride complex that is formed is stable under ambient conditions and is not sensitive to shock. No side reactions occur that result in the formation of diacetylene or acetylides that have explosive properties. The ease and safety with which solutions of the complex can be handled is surprising since it is well known that under certain conditions acetylene reacts with copper to form explosive acetylides.

The invention is further illustrated by the examples that follow.

EXAMPLE 1

To one mole of anhydrous aluminum chloride in toluene was added 1.1 moles of cuprous chloride. The resulting solution was filtered to remove unreacted cuprous chloride and impurities. This solution contained 28.6 mole percent of cuprous aluminum tetrachloride and 71.4 mole percent of toluene.

This solution was contacted with acetylene at 25° C. to form a solution that contained about 30 mole percent of an acetylene-cuprous aluminum tetrachloride complex that contained equimolar amounts of acetylene, cuprous chloride and aluminum chloride.

The acetylene complex solution was stored at 20°–30° C. for several days. More than 97 percent of the acetylene was then recovered from the solution by stripping it with benzene vapor at 80° C. and cooling the recovered vapors to condense the benzene.

EXAMPLE 2

A cuprous aluminum tetrachloride solution in toluene, which was prepared by the procedure described in Example 1, was contacted with diacetylene at 25° C. The product obtained was a solution in toluene of a diacetylene-cuprous aluminum tetrachloride complex that contained equimolar amounts of diacetylene, cuprous chloride, and aluminum chloride.

EXAMPLE 3

A cuprous aluminum tetrachloride solution in toluene, which was prepared by the procedure described in Example 1, was contacted with vinylacetylene at 25° C. The product obtained was a solution in toluene of a vinylacetylene-cuprous aluminum tetrachloride complex that contained equimolar amounts of vinylacetylene, cuprous chloride, and aluminum chloride.

EXAMPLE 4

A gas mixture obtained by the pyrolysis of natural gas had the following composition:

|  | Mm. |
|---|---|
| Hydrogen | 560 |
| Carbon monoxide | 280 |
| Acetylene | 75 |
| Methane | 60 |
| Carbon dioxide | 25 |

The pyrolysis gas at ambient temperature and 19 p.s.i.a. pressure was fed to an absorption column in which it was contacted countercurrently with a stream of a solution that contained about 22 mole percent of cuprous aluminum tetrachloride and 78 mole percent of toluene. The amount of the solution fed into the column was at least that which contained sufficient cuprous aluminum tetrachloride to react with all of the acetylene in the pyrolysis gas. The acetylene in the gas was distributed between the gas phase and the liquid phase in a manner consistent with its solubility in toluene at ambient temperature. The carbon monoxide was also distributed between the gas and liquid phases. All of the other constituents of the pyrolysis gas are inert and, except for a small amount that was dissolved, remained in the gas phase.

As the gas ascended in the absorption column, acetylene was preferentially absorbed in the downgoing solution, and carbon monoxide preferentially remained in the gas phase. The gas leaving the column contained less than 5 mm. Hg partial pressure of acetylene. Near the bottom of the column the downgoing solvent stream was contacted with an upgoing gas stream provided by recycling a small amount of the acetylene product. This gas stream stripped carbon monoxide and all of the other gases from the solution.

The solution containing the acetylene-cuprous aluminum tetrachloride complex was pumped to a storage area where it was stored for several days. It was then pumped to the top of a solvent regeneration tower and allowed to flow down against an upcoming stream of toluene vapor. The toluene vapor stripped acetylene from the solution and carried it from the tower. This gas stream was cooled to ambient temperature in a condenser. The condensed toluene was returned to the system. The gas leaving the condenser was acetylene saturated with toluene. A small portion of this gas stream was returned to the absorption column. The rest of the gas stream was cooled to remove the remaining toluene from it. In this way about 95 percent of the acetylene in the pyrolysis gas was recovered as substantially pure acetylene.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:
1. A process that comprises:
   (a) Contacting a gas containing at least 2 mole percent of an acetylenic compound having the structural formula

$$RC\equiv CH$$

wherein R represents hydrogen, vinyl, ethyl, or an alkyl group having from 1 to 10 carbon atoms in a first location with a solution containing about 25 percent to 70 percent by weight of cuprous aluminum tetrachloride in a solvent that is an aromatic hydrocarbon or a halogenated aromatic hydrocarbon, thereby forming a solution of an acetylenic compound-cuprous aluminum tetrachloride complex in said aromatic solvent;

(b) transporting the acetylenic compound-cuprous aluminum tetrachloride complex solution from said first location to a second location;

(c) contacting said solution in the second location with a countercurrent stream of a stripping agent selected from the group consisting of benzene, toluene, heptane, chlorobenzene, chlorotoluene, and chlorohexane at a tempearture in the range of 75° C. to 180° C.;

(d) separating from said solution a gas stream containing the acetylenic compound and said stripping agent;

(e) cooling said gas stream to condense the stripping agent; and (f) separating the gaseous acetylenic compound from the liquid stripping agent.

2. The process of claim 1 wherein the acetylenic compound is acetylene.

3. The process of claim 1 wherein the solution used in step (a) contains about 60 percent to 70 percent by weight of cuprous aluminum tetrachloride in toluene.

4. The process of claim 1 wherein the solution formed in step (a) is stored for from about 1 hour to about 3 days at ambient temperature before it is transported to said second location.

5. The process of claim 1 wherein step (c) the solution is contacted with a countercurrent stream of toluene vapor at about 110° C.

6. The process for the separation of an acetylenic compound having the structural formula $$RC \equiv CH$$

wherein R represents hydrogen, vinyl, ethynyl, or an alkyl group having from 1 to 10 carbon atoms from a gas mixture containing at least 2 mole percent of said acetylenic compound that comprises the steps of contacting said gas mixture with a solution that contains about 25 percent to 70 percent by weight of cuprous aluminum tetrachloride in a solvent that is an aromatic hydrocarbon or halogenated aromatic hydrocarbon, separating the resulting solution of the acetylenic compound-cuprous aluminum tetrachloride complex from the gas mixture, contacting the solution containing the acetylenic compound-cuprous aluminum tetrachloride complex with a countercurrent stream of a stripping agent selected from the group consisting of benzene, toluene, heptane, chlorobenzene, chlorotoluene, and chlorohexane at a temperature in the range of 75° C to 180° C., separating a gas stream containing the acetylenic compound and the stripping agent from the solution, and recovering substantially pure acetylenic compound from the gas stream.

7. The process of claim 6 wherein the acetylenic compound is acetylene.

8. The process of claim 6 wherein the gas mixture is contacted with a solution that contains 60 to 70 percent by weight of cuprous aluminum tetrachloride in toluene.

References Cited
UNITED STATES PATENTS

| | | | |
|---|---|---|---|
| 3,592,865 | 7/1971 | Long et al. | 260—677 A |
| 2,441,400 | 5/1948 | Doumani et al. | 260—681.5 |
| 3,562,349 | 2/1971 | Pawloski et al. | 260—671.7 A |
| 2,913,505 | 11/1959 | Vann Raay et al. | 260—677 R |
| 3,068,304 | 12/1962 | Spector | 260—677 R |
| 3,647,843 | 3/1972 | Walke et al. | 260—438.1 |
| 3,218,366 | 11/1965 | Baxter et al. | 260—677 |
| 3,420,862 | 1/1969 | Long | 260—678 A |

DELBERT E. GANTZ, Primary Examiner

J. M. NELSON, Assistant Examiner

U.S. Cl. X.R.

260—677 A, 681—5 C